(No Model.)
S. W. JACKSON.
FERTILIZER DISTRIBUTER.
No. 340,217. Patented Apr. 20, 1886.
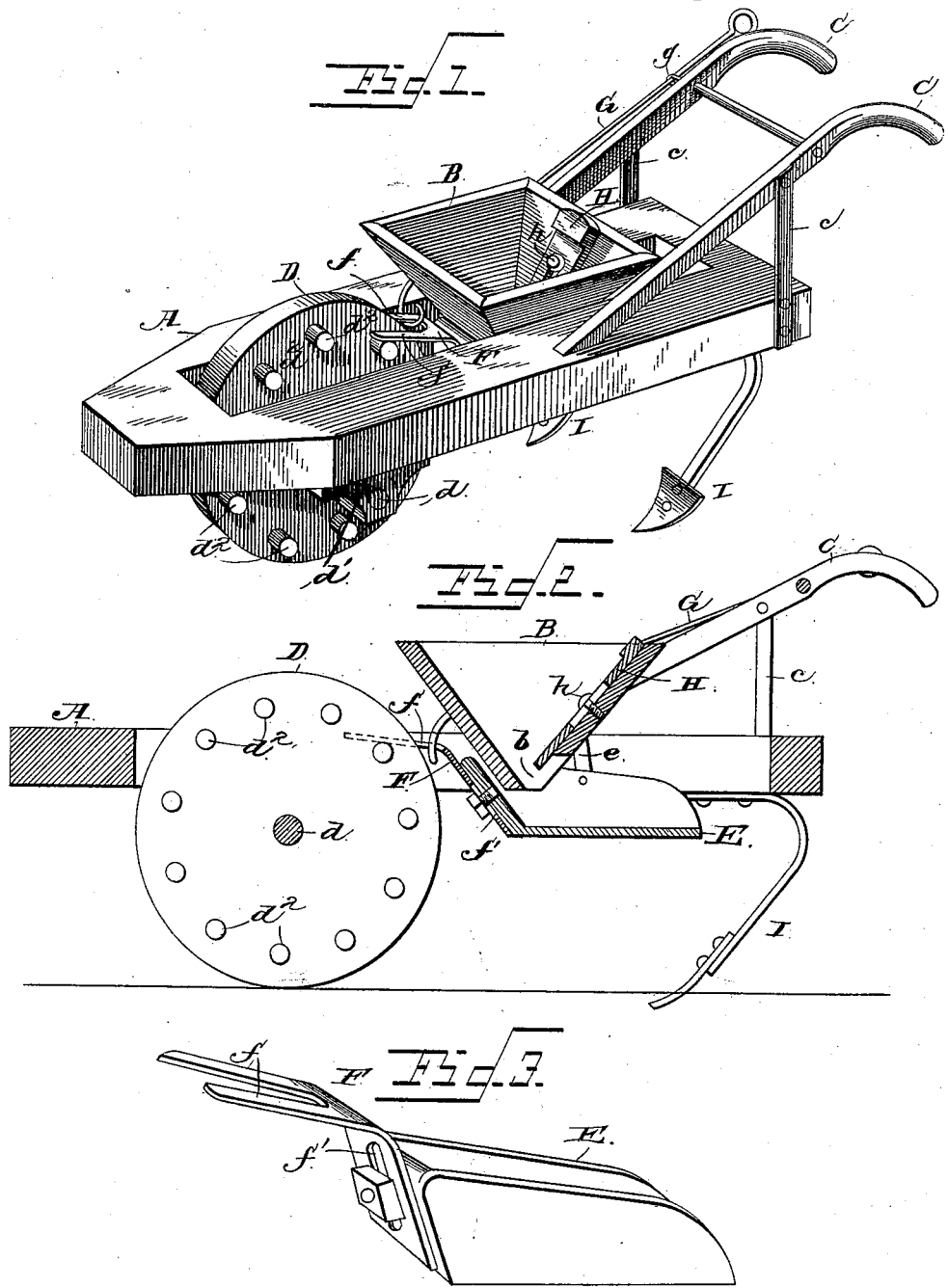

UNITED STATES PATENT OFFICE.

SIDNEY WARREN JACKSON, OF CRANESVILLE, SOUTH CAROLINA.

FERTILIZER-DISTRIBUTER.

SPECIFICATION forming part of Letters Patent No. 340,217, dated April 20, 1886.

Application filed January 4, 1886. Serial No. 187,570. (No model.)

*To all whom it may concern:*

Be it known that I, SIDNEY WARREN JACKSON, a citizen of the United States, residing at Cranesville, in the county of Marion and State of South Carolina, have invented a new and useful Improvement in Fertilizer-Distributers, of which the following is a specification, reference being had to the accompanying drawings.

My invention relates to improvements in fertilizer-distributers; and it consists of the peculiar construction and combination of parts, substantially as hereinafter fully set forth, and specifically pointed out in the claims.

The primary object of my invention is to provide an improved mechanism for dropping a charge of fertilizer of given quantity at regular intervals apart.

A further object of the invention is to provide means whereby the charge can be varied, to provide means which shall be very simple, strong, and durable in construction, thoroughly effective and automatic in operation, and cheap.

In the accompanying drawings, Figure is a perspective view of a fertilizer-distributer constructed in accordance with my invention. Fig. 2 is a vertical longitudinal sectional view, and Fig. 3 is a detached detail view of the vibrating hopper and the trip-arm therefor.

Referring to the drawings, in which like letters of reference indicate corresponding parts in the several figures, A designates the frame of my improved fertilizer-distributer; B, the hopper, mounted on the frame in any suitable manner; C, the handles, secured to the frame and strengthened by brace-arms $c$, and D the drive-wheel, that is arranged between the longitudinal sills of the frame A in front of the hopper B, and secured on a shaft, $d$, that is journaled in proper boxes or bearings, $d'$, rigidly secured to the frame A.

The hopper B has a contracted discharge-opening, $b$, in its bottom, through which passes the fertilizer as it escapes from the hopper into a delivery spout or shoe, E. This spout is disposed longitudinally of the machine in an approximately horizontal position, and the said hopper is supported near or at one end in depending supports $e$. These supports are rigidly secured at one end to the frame A at a point near the rear end of the hopper, and at their lower ends they are either pivotally or rigidly connected to the delivery-spout. These supports are preferably made of some durable flexible material—as, for instance, leather or rubber; but they may be of metal and rigid, as it is obvious that either kind of support may be employed to loosely suspend the discharge-spout so that it can oscillate vertically. The front end of the vertically-oscillating discharge-spout extends beyond the front edge of the hopper, and is provided with a trip-arm, F, which has two upwardly and forwardly curved or inclined fingers, $f$, that fit on opposite faces of the drive-wheel D, and these arms are successively acted on by a series of cogs or teeth, $d^2$. These cogs are spaced apart on the side faces of the drive-wheel near its periphery, and when the machine is drawn across a field the drive-wheel is rotated by frictional contact with the ground, thus causing the cogs or teeth $d^2$ to successively act upon the trip-arm F and oscillate or move the discharge-spout E to cause a limited amount of fertilizer to be sown, the rate and quantity of feed or discharge being regulated by the inclination of the discharge-spout and the rapidity with which the machine is moved to cause the cogs to oscillate the discharge-hopper to a greater or less number of times within a given period.

The rear end of the trip-arm F is rigidly secured to the front end of the oscillating discharge-spout, and to provide for varying the inclination of the spout to vary the quantity of fertilizer sown at each oscillation of the discharge-spout the rear end of the trip-arm is slotted longitudinally, as at $f'$, and adjustably secured to the discharge-spout by a bolt and nut, as clearly shown in Fig. 3.

The depending supports $e$ for the oscillating discharge-spout, are connected thereto at a point to one side of the longitudinal axis of the spout, thus eccentrically and pivotally supporting the same, and the rear end of said spout is supported by the arms of the trip coming in contact with the teeth or pins of the drive-wheel.

It will be seen that the pins of the drive-wheel are successively brought into engagement with and drawn away from the arms of of the trip when the machine is moved forward, and the trip falls by gravity to engage the succeeding pin of the drive-wheel, which acts upon the trip to raise and depress it, this operation being repeated each time the pin or cog of the drive-wheel acts upon the trip-arm.

I attach especial importance to adjustably connecting the trip-arm and oscillating discharge-spout together, as it will be observed that the rear end of the discharge-spout will be lowered when the trip-arm is adjusted upwardly on the front end of the said spout, and when the trip-arm is depressed downwardly or lower on the spout the rear end of the latter will be elevated. The angle or inclination of the discharge-spout can thus be varied for the purpose of increasing or diminishing the quantity of fertilizer discharged at each oscillation of the spout.

G designates a rod for throwing the fingers of the trip into and out of engagement with the pins of the drive-wheel, the front end of said rod being connected to the trip in any suitable manner, and extends to the rear of the machine, within convenient reach of the operator, the rod being suitably supported in guides g.

H designates a longitudinally-slotted cut-off plate, which is arranged in the hopper and held in any desired adjustment by a bolt, h, the said cut-off plate being disposed in an upright inclined position with its lower end fitted in the discharge-opening b of the hopper. This cut-off plate can be adjusted vertically to vary the size of the opening b of the hopper, thus providing additional means for regulating the quantity of fertilizer discharged.

I designates the covering-plows, which are arranged in rear of the hopper and depend from the side sills of the frame A, to which they are suitably secured.

The operation of my improved fertilizer-distributer will be readily understood from the foregoing description, taken in connection with the drawings.

Various slight changes in the form and proportion of parts may be made without departing from the principle of my invention.

I do not desire to broadly claim an oscillating discharge-spout suspended beneath a hopper and a trip permanently attached thereto and adapted to be struck by pins or teeth on a revolving drive-wheel, nor a rod or cord connected to the trip for throwing the same into and out of the path of rotation of the pins on the drive-wheel, nor a vertically-adjustable cut-off plate in the hopper, as I am aware that such construction is not broadly new; and hence I limit my claim to securing the trip adjustably to the oscillating discharge-spout, whereby the inclination thereof will be varied to drop a greater or less quantity of fertilizer, and to the peculiar construction of the parts set forth in the claims.

Having thus described my invention, what I claim as new is—

1. In a fertilizer-distributer, the combination of a frame, a hopper, a drive-wheel having projecting pins, an oscillating discharge spout suspended beneath the hopper, a trip having a longitudinal slot, and the angular arms arranged in the path of movement of the pins or the drive-wheel, and a bolt passing through the slot of the trip to adjustably secure the same to the discharge-spout, whereby the trip can be adjusted and vary the inclination of the discharge-spout and the quantity of fertilizer dropped therefrom, substantially as described.

2. In a fertilizer-distributer, the combination of the following elements: a frame, A, a hopper, a drive-wheel, D, mounted in the frame, a vertically-oscillating discharge-spout eccentrically suspended beneath the hopper, a trip having a longitudinal slot and forwardly inclined or curved fingers, a bolt for adjustably securing the slotted trip to the discharge-spout, a rod connected to the trip for throwing the same into and out of operation, and a slotted cut-off plate located in the hopper and vertically adjustable in the discharge-opening therein, the whole combined and adapted to serve as and for the purpose described.

In testimony that I claim the foregoing as my own I have hereto affixed my signature in presence of two witnesses.

SIDNEY WARREN JACKSON.

Witnesses:
JOHN JEREMIAH BETHEA,
DAVID SMITH ALLEN.